United States Patent Office 3,126,362
Patented Mar. 24, 1964

3,126,362
SYNTHETIC LINEAR POLYAMIDES FROM 2,5-DIMETHYL-p-PHENYLENE DIACETIC ACID
Jan Bussink, Arnhem, Netherlands, assignor to American Enka Corporation, Enka, N.C., a corporation of Delaware
No Drawing. Filed May 9, 1960, Ser. No. 27,519
Claims priority, application Netherlands June 2, 1959
5 Claims. (Cl. 260—78)

This invention relates to synthetic linear polyamides and to a process for manufacturing the same.

In the prior art, it has been proposed to obtain synthetic linear polyamides by heating diamines and dicarboxylic acids or amide forming derivatives of these acids or salts of diamines and dicarboxylic acids. Some of the diamines that have been proposed are hexamethylene diamine, octamethylene diamine, m-xylylene diamine and p-xylylene diamine. An example of a dicarboxylic acid that has found particular usefulness is adipic acid.

Polyamides prepared from the above-described compounds are well known and widely used. It has been found, however, that such polyamides absorb a relatively large and undesirable amount of moisture.

It has been proposed to overcome this difficulty by forming the synthetic linear polyamide from nonamethylene diamine or decamethylene diamine and sebacic acid or p,p'-diphenol propane diacetic acid. These polyamides absorb relatively little moisture; however, there exists a serious drawback to their extensive use. This is because they have a relatively low melting point, i.e., below 200° C. when compared to the aforementioned polyamides.

It is, therefore, an object of this invention to provide a synthetic linear polyamide of relatively low moisture absorption and relatively high melting point.

It is a further object of this invention to provide a process for manufacturing a synthetic linear polyamide of relatively low moisture absorption and relatively high melting point.

These and other objects of this invention will become apparent from a reading of the following detailed description.

It has now been found that fibers, films, and molded articles of relatively low moisture absorption and relatively high melting point synthetic linear polyamides may be easily obtained. These are obtained by heating a diamine selected from the group consisting of nonamethylene diamine and decamethylene diamine with a diacetic acid compound selected from the group consisting of 2,5-dimethyl-p-phenylene diacetic acid, its amides, esters or nitriles.

These novel synthetic linear polyamides may be formed by conventional polyamide forming processes. As for example, the diamine and diacetic acid compound may be mixed and then heated to polyamide forming temperatures. This reaction may or may not be conducted in the presence of solvents, such as water.

Normally, the reactants will be present in substantially equal molar proportions. However, an excess of either compound may be used provided the excess is not over five mole percent.

The temperature and pressure to which the reaction mixture is subjected is that normally used in conventional polyamide forming reactions. For instance, the pressure during the start-up will be atmospheric pressure. This will increase during the reaction to about 20 atmospheres and then decrease to about atmospheric pressure. The temperature will normally be in excess of 225° C. and may be as high as about 300° C. To insure that the polymer is not degraded by oxygen, the later stages of the reaction should be conducted in a nitrogen atmosphere.

Having described this invention generally, reference should now be had to the following specific examples. It should be understood that they are merely for the purpose of illustration and are not to be considered as limiting the scope of this invention.

Example I

Equivalent proportions of nonamethylene diamine and 2,5-dimethyl-p-phenylene diacetic acid were mixed with water in a proportion of four parts water to one part reaction mixture. This mixture was heated in a stainless steel autoclave in 45 minutes to 225° C. The pressure therein increased to about 19 atmospheres. The temperature was then raised to 240° C. in 120 minutes. The pressure was thereupon reduced to atmospheric pressure in about 90 minutes and the temperature raised to 290° C. The polymerization was thereafter continued for 60 minutes, under nitrogen, and at atmospheric pressure.

The resulting synthetic linear polyamide had a melting point of 238° C. and was not brittle. It would absorb no more than 1.2% by weight of moisture.

Example II

A synthetic linear polyamide was prepared by the method of Example I, except that decamethylene diamine was used instead of the nonamethylene diamine.

The polymer was not brittle and it had a melting point of 242° C. It would not absorb more than 1.0% moisture.

It can be seen from the foregoing that this novel synthetic linear polyamide has a desirable low moisture absorption and a desirable high melting point.

It should be understood that many modifications may be made in this invention without departing from its spirit and scope which is to be limited only by the following claims.

What is claimed is:

1. A process for manufacturing synthetic linear polyamides comprising mixing equal molar proportions of a diamine selected from the group consisting of nonamethylene diamine and decamethylene diamine and 2,5-dimethyl-p-phenylene diacetic acid, heating said mixture to about 225° C. in about 45 minutes, then heating said mixture to 240° C. in about 120 minutes, and thereafter heating said mixture to 290° C. for about 60 minutes.

2. A process according to claim 1 wherein said diamine is nonamethylene diamine.

3. A process according to claim 1 wherein said diamine is decamethylene diamine.

4. Poly(nonamethylene-2,5-dimethyl-p-phenylene diacetamide) having a melting point of about 238° C. and a moisture absorption of not more than 1.2% by weight.

5. Poly(decamethylene-2,5-dimethyl-p-phenylene diacetamide) having a melting point of about 242° C. and a moisture absorption of not more than 1.0% by weight.

References Cited in the file of this patent

UNITED STATES PATENTS

| 2,163,584 | Carothers et al. | June 27, 1939 |

FOREIGN PATENTS

| 135,269 | Australia | Jan. 16, 1947 |
| 627,733 | Great Britain | Aug. 15, 1949 |
| 797,617 | Great Britain | July 2, 1958 |
| 804,225 | Great Britain | Nov. 12, 1958 |